(12) United States Patent
Hong et al.

(10) Patent No.: US 12,487,500 B2
(45) Date of Patent: Dec. 2, 2025

(54) MULTIPLE TRAVELING WAVEGUIDES TO FACILITATE OPTICAL MODULATION

(71) Applicant: Intel Corporation, Santa Clara, CA (US)

(72) Inventors: Jin Hong, Saratoga, CA (US); Jianying Zhou, Dublin, CA (US)

(73) Assignee: Intel Corporation, Santa Clara, CA (US)

( * ) Notice: Subject to any disclaimer, the term of this patent is extended or adjusted under 35 U.S.C. 154(b) by 896 days.

(21) Appl. No.: 17/403,622

(22) Filed: Aug. 16, 2021

(65) Prior Publication Data

US 2021/0373412 A1 Dec. 2, 2021

Related U.S. Application Data

(60) Provisional application No. 63/174,475, filed on Apr. 13, 2021.

(51) Int. Cl.
*G02F 1/225* (2006.01)
*G02F 1/21* (2006.01)

(52) U.S. Cl.
CPC ............ *G02F 1/2255* (2013.01); *G02F 1/212* (2021.01); *G02F 1/2257* (2013.01); *G02F 2202/10* (2013.01)

(58) Field of Classification Search
CPC ....... G02F 1/225; G02F 1/2255; G02F 1/2257
See application file for complete search history.

(56) References Cited

U.S. PATENT DOCUMENTS 4,553,810 A * 11/1985 Alferness ............... G02F 1/0356
385/132
2003/0190107 A1* 10/2003 Walker .................... G02F 1/225
385/2

(Continued)

FOREIGN PATENT DOCUMENTS

EP 4080272 A1 * 10/2022
JP 2003-322831 A * 11/2003

OTHER PUBLICATIONS

H. Sepehrian et al. Silicon photonic IQ modulators for 400 Gb/s and beyond. Journal of Lightwave Technology, 37:13:3078-3086, Jul. 1, 2019 (https://doi.org/10.1109/JLT.2019.2910491) (Year: 2019).*

(Continued)

*Primary Examiner* — Michael Stahl
(74) *Attorney, Agent, or Firm* — Schwabe, Williamson & Wyatt, P.C.

(57) ABSTRACT

Embodiments described herein may be related to apparatuses, processes, and techniques directed to a multiple traveling waveguide structure to synthesize EO frequency responses used for optical modulation. Multiple traveling waveguide devices may include a plurality of traveling waveguides, each with different characteristics resulting in a different EO response within a target frequency range. These different characteristics may be achieved by varying the PN junction, PN doping level, optical waveguides, RF waveguides and the like for each traveling waveguide. The multiple traveling waveguide structure is formed by combining each traveling waveguide in a serial and/or parallel fashion, and then iteratively optimized based on artificial intelligence (AI) training sequences, to achieve an overall optical modulation beyond 100 GHz. Other embodiments may be described and/or claimed.

29 Claims, 10 Drawing Sheets

(56) References Cited

U.S. PATENT DOCUMENTS

| | | | | |
|---|---|---|---|---|
| 2004/0052442 | A1* | 3/2004 | Li | G02F 1/01708 |
| | | | | 385/40 |
| 2012/0230627 | A1* | 9/2012 | Motoya | G02F 1/2255 |
| | | | | 385/3 |
| 2016/0139486 | A1* | 5/2016 | Dagli | G02F 1/01708 |
| | | | | 438/69 |
| 2018/0039151 | A1* | 2/2018 | Doerr | H04B 10/516 |
| 2018/0341164 | A1* | 11/2018 | Williams | G02F 1/2257 |
| 2021/0080798 | A1* | 3/2021 | Kissa | G02F 1/2255 |
| 2021/0373364 | A1* | 12/2021 | Zhang | G02F 1/0356 |
| 2021/0373410 | A1* | 12/2021 | Zhou | G02F 1/218 |
| 2023/0078976 | A1* | 3/2023 | Breyne | G02F 1/225 |
| | | | | 385/3 |

OTHER PUBLICATIONS

G. Li et al. Analysis of segmented traveling-wave optical modulators. Journal of Lightwave Technology, 22:7:1789-1796, Jul. 2004 (https://doi.org/10.1109/JLT.2004.831179) (Year: 2004).*

D. Patel et al. Design, analysis, and transmission system performance of a 41 GHz silicon photonic modulator. Optics Express, 23:11:14263-14287, Jun. 1, 2015 (https://doi.org/10.1364/OE.23.014263) (Year: 2015).*

C. Xiong et al. Monolithic 56 GB/s silicon photonic pulse-amplitude modulation transmitter. Optica, 3:10:1060-1065, Oct. 2016 (https://doi.org/10.1364/OPTICA.3.001060) (Year: 2016).*

* cited by examiner

MULTIPLE TRAVELING WAVEGUIDES TO FACILITATE OPTICAL MODULATION

RELATED APPLICATION

This application claims priority to U.S. Provisional Application No. 63/174,475, filed Apr. 13, 2021. The specification of this application is hereby incorporated by reference in its entirety.

FIELD

Embodiments of the present disclosure generally relate to the field of semiconductor devices and packaging, and in particular to optical and radiofrequency (RF) waveguides.

BACKGROUND

Continued growth in computing and mobile devices will continue to increase the demand for increased bandwidth density within and between dies of semiconductor devices and packages.

DETAILED DESCRIPTION

Embodiments described herein may be related to apparatuses, processes, and techniques related to devices that include multiple TWs that may be used to synthesize EO frequency responses that may be used for optical modulation up to and beyond 100 GHz frequencies. In embodiments, these devices that include multiple TWs may also be referred to as distributed traveling waveguide structures.

In embodiments, the multiple TW devices may include a plurality of TWs that each may have different characteristics, for example a different EO response within a target frequency range. These different characteristics for each TW may be achieved by varying the PN junction, PN doping level, optical waveguides, RF waveguides and the like. The resulting multiple TW that results from combining each TW in a serial fashion may be used to achieve an overall optical modulation beyond 100 GHz. Next-generation switches may perform at or above 100 terabyte per second (Tb/s), and such Tb/s data center connections may be facilitated through high-efficiency optical modulation beyond 100 GHz as provided by embodiments described herein.

In embodiments, the resulting optical modulation achieved through synthesizing EO frequency responses within multiple TWs may be applicable for high baud rate modulation applications, for example Pulse-amplitude modulation (PAM), Quadrature amplitude modulation (QAM), and the like. These embodiments may also be applicable to subcarrier modulation applications, for example orthogonal frequency division multiplexing (OFDM), optical transmitter modules (OTM), and the like.

The implementations for legacy silicon photonic modulators use a single TW modulator and as a result are limited to less than 50 GHz of electro-optical bandwidth (EO BW). However, the intrinsic response of the carrier depletion for an optical modulator is determined by the time of carriers to be swept out and to the PN junction of the TW, which may reach beyond 100 GHz. Although legacy implementations may use indium phosphide (InP) within a TW that may reach beyond 50 GHz, legacy implementations do not have high performance with efficient modulation response.

Some legacy implementations may use multiple TW each with the same characteristics, resulting in identical TW segments. Although such legacy implementations may improve modulation efficiency, they provide a very limited improvement on the frequency response.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an ASIC, an electronic circuit, a processor (shared, dedicated, or group) and/or memory (shared, dedicated, or group) that execute one or more software or firmware programs, a combinational logic circuit, and/or other suitable components that provide the described functionality.

Various Figures herein may depict one or more layers of one or more package assemblies. The layers depicted herein are depicted as examples of relative positions of the layers of the different package assemblies. The layers are depicted for the purposes of explanation, and are not drawn to scale. Therefore, comparative sizes of layers should not be assumed from the Figures, and sizes, thicknesses, or dimensions may be assumed for some embodiments only where specifically indicated or discussed.

Figure 1:
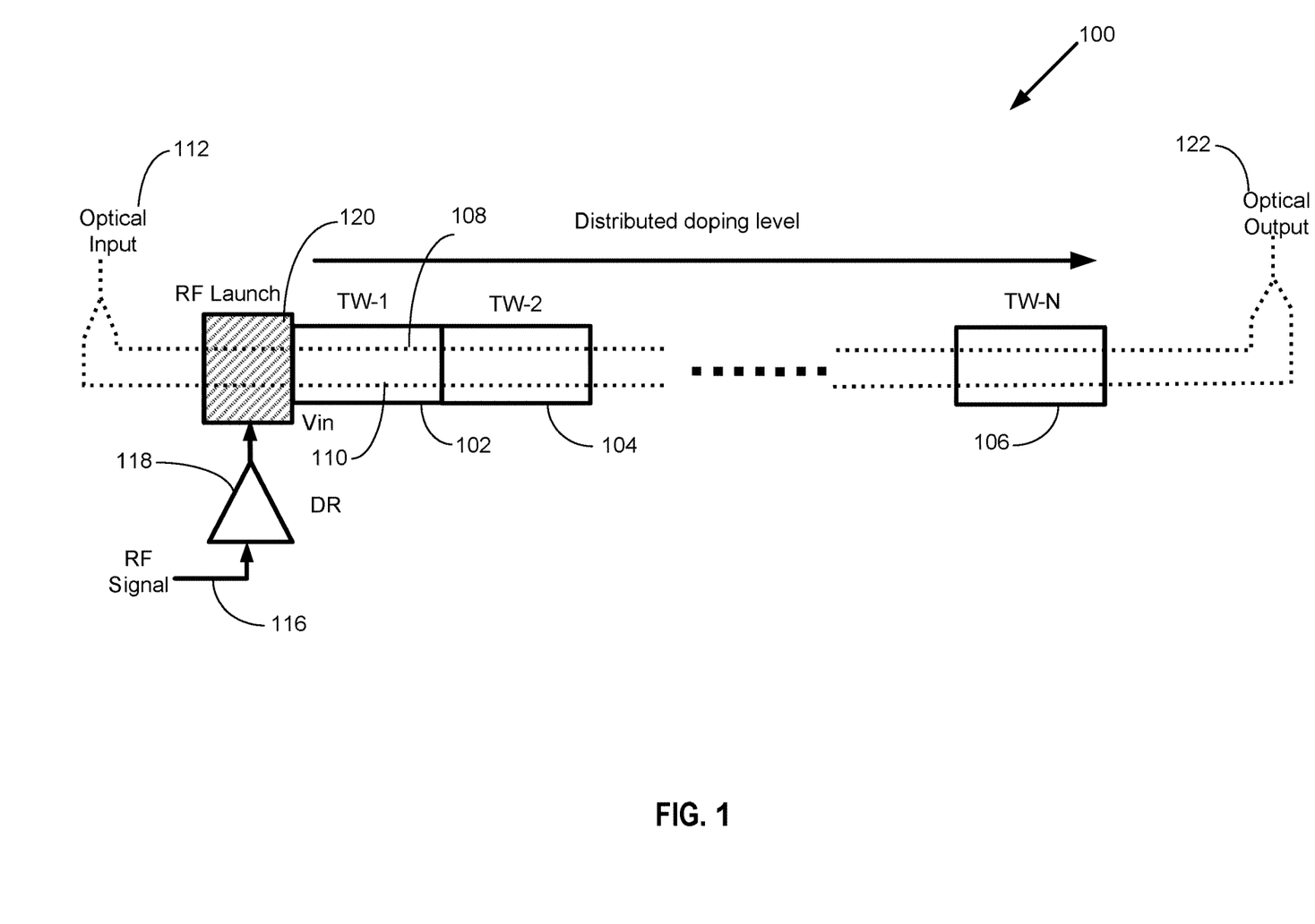
FIG. 1 is a block diagram of a multiple traveling waveguide (TW) structure, in accordance with various embodiments.

FIG. 1 is a block diagram of a multiple TW structure, in accordance with various embodiments. Multiple TW structure 100, which may also be referred to as a distributed traveling waveguide structure, includes a plurality of TWs 102, 104, 106 that are coupled with each other in a serial fashion. Each TW 102, 104, 106 include a pair of optical waveguides 108, 110, that are optically coupled together in a serial fashion. An optical input 112 may provide continuous wave (CW) optical signals for the pair of optical waveguides 108, 110. The resulting optical signals on the pair of optical waveguides 108, 110 from the output of the last TW 106 will be combined to have an optical output 122.

Each TW 102, 104, 106 may also include one RF waveguide, as part of each TW, that may be coupled with each other in a serial fashion. An RF signal 116 may be input to a driver 118. An RF launcher 120 may build RF interconnect from the RF output of driver 118 to the RF input of TW-1 102. Although only one RF driver 118 is used for synthesis of multiple TW structures for modulation at or beyond 100 GHz, in embodiments described below there may be multiple RF drivers.

During operation, the multiple TW structure 100 may receive CW optical signal from the optical input 112 that are modulated at or above 100 GHz by synthesizing optical modulation responses using the individual TWs 102, 104, 106. In embodiments, each TW 102, 104, 106 has its own target EO frequency response that has been designed by varying characteristics of each of the TW 102, 104, 106. In embodiments, the characteristics of each TW may be varied include PN junction, PN doping level, optical waveguides, RF waveguides and the like, which will determine of RF response of RF waveguide and phase match between optical and RF travelling waves.

During operation, the overall optical modulation, or synthesized modulation, of the multiple TW structure 100 is dependent on a combination of optical phase modulations of all of the TWs 102, 104, 106. For example, distributed doping levels may be increased in each successive TW from the first TW 102 to the last TW 106.

Figure 2:
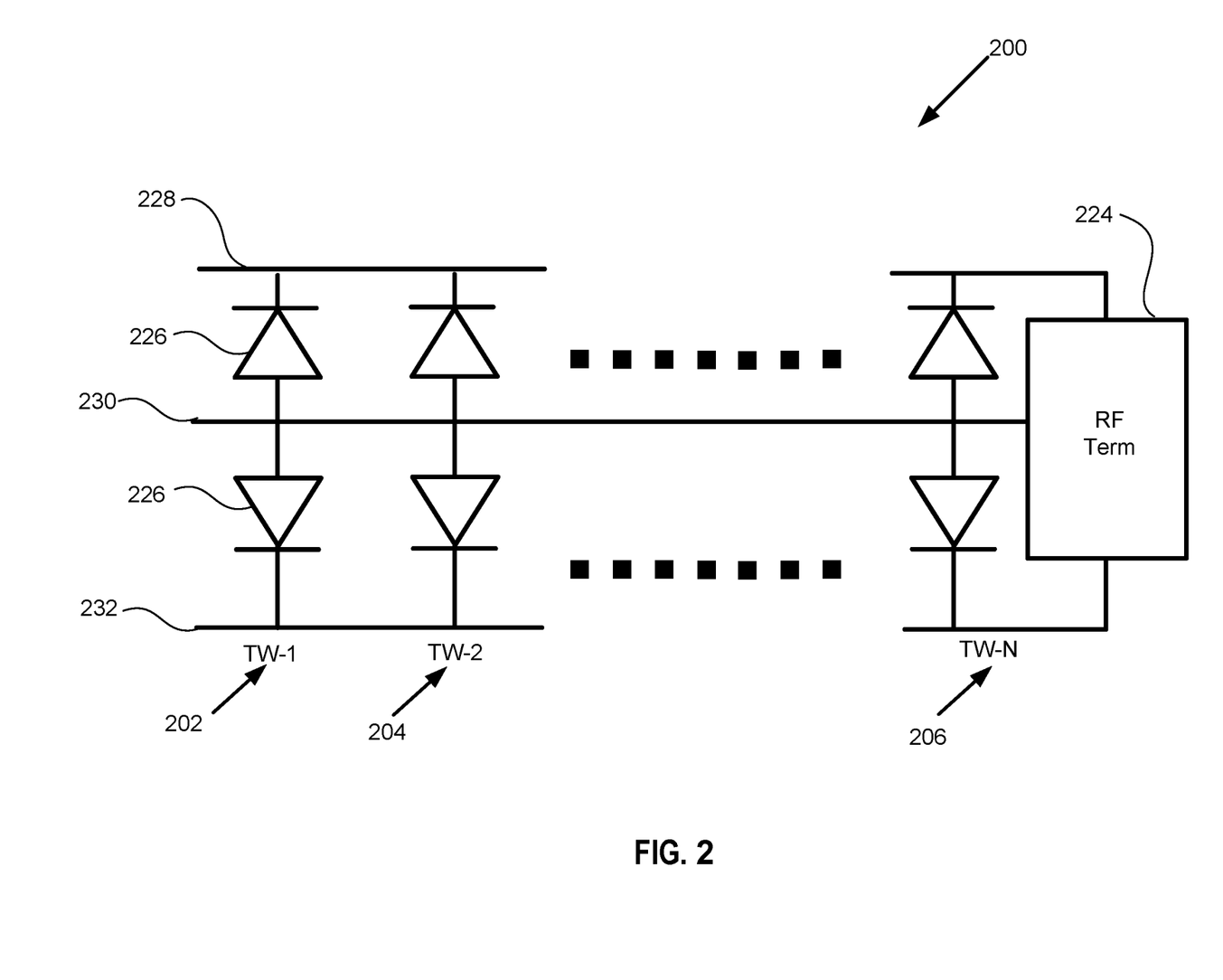
FIG. 2 is an equivalent circuit diagram of a multiple TW structure such as that of FIG. 1, in accordance with various embodiments.

FIG. 2 is an equivalent circuit diagram of a multiple TW structure such as that of FIG. 1, in accordance with various embodiments. Multiple TW structure 200, which may be similar to multiple TW structure 100 of FIG. 1, may be used for synthesis and is represented as an equivalent circuit diagram. TWs 202, 204, 206 may be similar to TWs 102, 104, 106 of FIG. 1. An RF termination circuit 224 may be coupled with RF circuitry of the last TW 206. The various diodes 226 represent push-pull PN junctions in a pair of optical waveguides similar to the pair of optical waveguides 108 and 110. The top line 228 and bottom line 232 represent the two electrodes of RF waveguide. The centerline 230 between the diodes 226 represents PN bias for the pair of PN junctions.

Optical modulation may be realized with a Mach-Zehnder interferometer (MZI), where the overall optical modulation is dependent upon a combination of optical phase modulations of all TWs 202, 204, 206.

Theoretical Background for Phase Match

The modulation EO response of single TW-Mach-Zehnder Modulator (MZM) (EO_Res) based on carrier depletion is dependent on the RF electrical to electrical (EE) response (EE_Res) and EO conversion response (EO Cony). The EO conversion is determined by phase match between RF and optical travelling waves. For small signal linear conditions, EO modulation of TW-MZM is achieved by optical phase modulation, $\delta\phi\_EO\_Res$, which can be expressed by:

$$\delta\phi\_EO\_RES = V_{in} K_0 a \int_0^L e^{-\alpha_m z} e^{j\Delta\varphi} dz \qquad (1)$$

Where $K_0$ is the free-space wavenumber, a is the conversion factor from voltage to optical refractive index change, V is applied input RF voltage amplitude, $\alpha_m$ is RF attenuation long RF TW representing EE response, and $\Delta\varphi$ is phase mismatch due to the velocity mismatch or index mismatch between the RF and the optical travelling waves which can be expressed by:

$$\Delta\varphi = 2\pi f z \left( \frac{1}{v_o} - \frac{1}{v_m} \right) = 2\pi f z \left( \frac{n_o}{c} - \frac{n_m}{c} \right) \qquad (2)$$

Where f is RF frequency, z is a position of the RF and optical waves traveling in forward direction, $v_m$ is the RF phase velocity, $v_o$ is optical velocity, c is optical free-space speed, $n_o$ is optical group index, $n_m$ is the RF index.

Optical synthesis with multiple TWs can be expressed by:

$$\delta\phi\_EO\_RES = V_1 K_0 a_1 \int_0^{L_1} e^{-\alpha_{m1} z} e^{j\Delta\varphi 1} dz + \ldots + V_N K_0 a_N \int_0^{L_N} e^{-\alpha_{mN} z} e^{j\Delta\varphi N} dz) \qquad (3)$$

Where V1, V2, ..., VN are voltage at TW input; a1, a2, ..., aN are the conversion factor from voltage to optical refractive index change, L1, L2, ..., and LN are the length, $\alpha_{m1}$, $\alpha_{m2}$, and $\alpha_{mN}$ are RF attenuation long RF TW representing EE response, and $\Delta\varphi1$, $\Delta\varphi2$, and $\Delta\varphi N$ are phases, in TW1 202, TW2 204, and TWN 206.

Synthesis for Beyond 100 Ghz Optical Modulation

Figure 3:
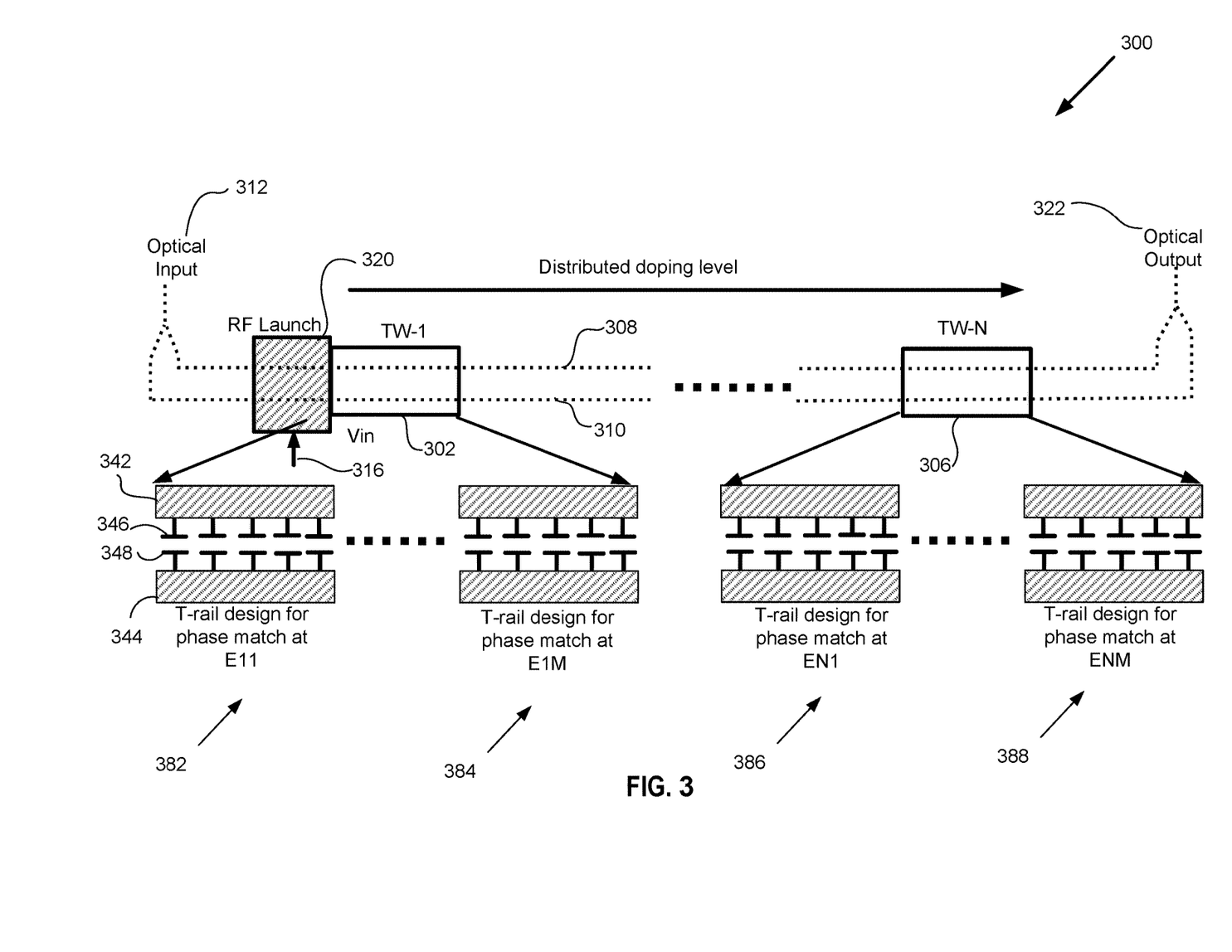
FIG. 3 is a block diagram of a multiple TW structure showing each TW with a different doping structure and multiple T-rail structures creating different phase matches at different frequencies, in accordance with various embodiments.

EO response in each TW is determined by TW RF loss and phase match between RF and optical propagation waves. FIG. 3 is a block diagram of a multiple TW structure showing each TW with a different doping structure and multiple T-rail structures creating different phase matches at different frequencies, in accordance with various embodiments.

In a non-limiting example embodiment for synthesis, multiple TW structure 300, which may be similar to multiple TW structure 100 of FIG. 1, shows a first TW-1 302 with the highest doping for the highest frequency response. A TW (not shown) coupled with TW-1 has the second high doping for the second highest frequency response and TW-N 306 has the lowest doping for lowest frequency response. In addition, there may be periodic structures that appear within electrodes of the RF waveguide, which may be similar to RF waveguide of FIG. 1, in TWs 302, 306.

As shown with respect to multiple TW structure 300, in each TW 302, 306, there may be multiple T-rail segments, for example T-rail segments 382, 384 associated with TW-1 302 and T-rail segments 386, 388 associated with TW-N 306 for achieving phase match at different frequencies for each TW 302, 306. These T-rail segments may include a first electrode 342 and second electrode 344 of the RF waveguide, to which various features 346 and 348 are physically and/or electrically coupled.

In embodiments, a first electrode 342 of the RF waveguide may have various features 346 that are physically and/or electrically coupled with the second electrode 342. In embodiments, these various features 346 may be perpendicular to a direction of the first electrode 342. In embodiments, a second electrode 344 of the RF waveguide may have various features 348 that are physically and/or electrically coupled with the second electrode 344. In embodiments, these features may be perpendicular to a direction of the second electrode 344. In embodiments, these features 346, 348 may correspond with each other while not being in direct electrical contact.

In embodiments, these features 346 and 348, associated with the electrodes 342 and 344, may be used to adjust RF index for the phase match between optical and RF waves at a desired frequency to maximize the modulation efficiency at the desired frequency. In embodiments, each TW, for example TW-1 302, may have M number of T-rails, each with a structure designed for a phase match at frequency f11 through frequency f1M. As shown, the first T-rail 382 for phase match at frequency f11 in element E11 for a target frequency response, through the Mth T-rail 384 for phase match at frequency at frequency f1M in element E1M for a target frequency response. These frequency responses in the elements can be synthesized to achieve a target EO frequency response in TW-1 302 and a maximized modulation efficiency. Similarly, TW-N has T-rails 386 with a structure designed for a phase match at frequency fN1 in element EN1, through the Mth T-rail 388 that has maximized modulation efficiency at the frequency fNM in element ENM. In embodiments, each of these can be synthesized to achieve a target EO frequency response in TW-N 306.

Figure 4:
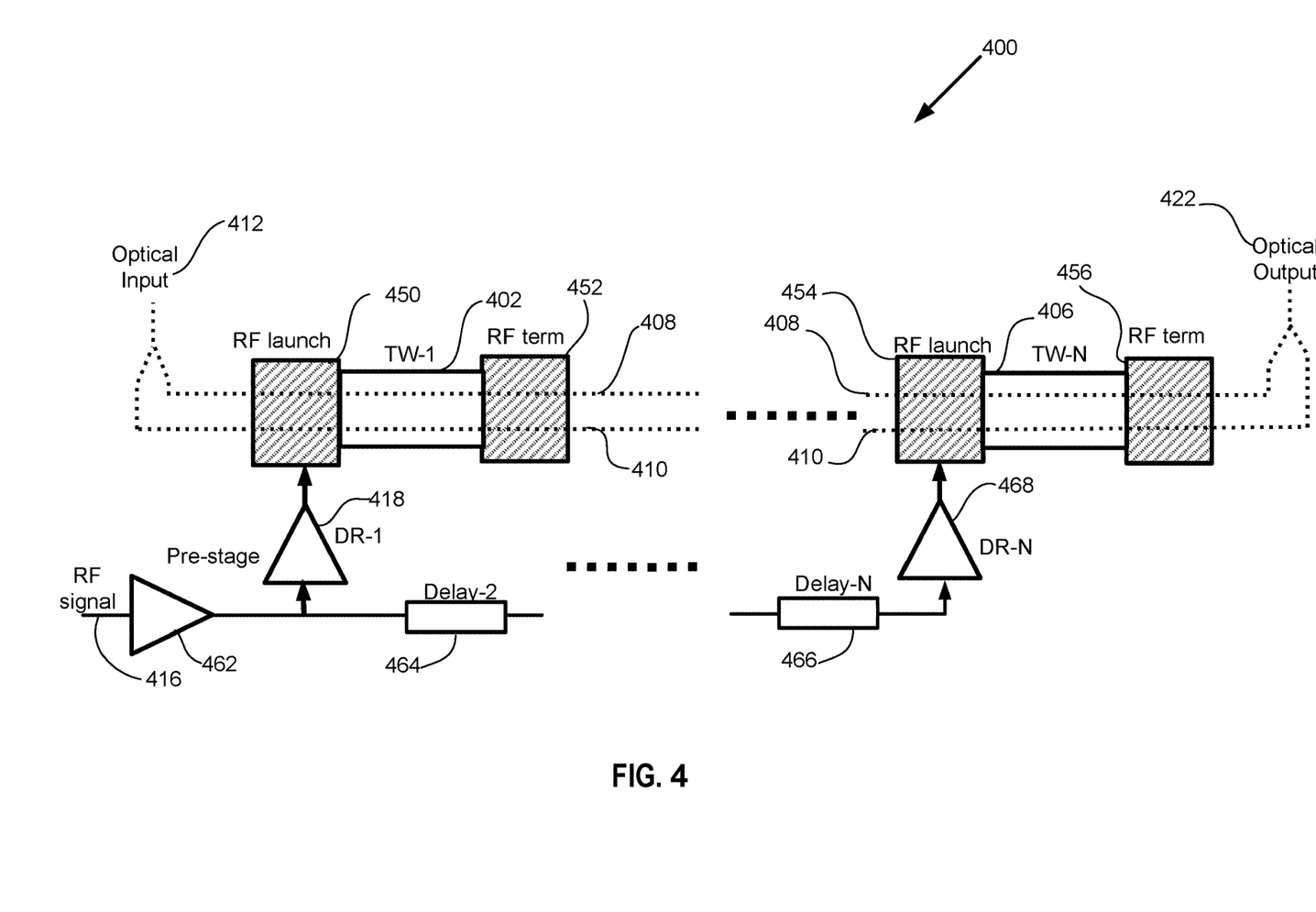
FIG. 4 is a block diagram of a multiple TW structure with distributed radiofrequency (RF) drivers, in accordance with various embodiments.

FIG. 4 is a block diagram of a multiple TW structure with distributed RF drivers, in accordance with various embodiments. Multiple TW structure 400 shows synthesis with multiple TWs 402, 406 and distributed drivers 418, 468. Distributed drivers 418, 468 can be used to boost RF signal; the driver 418 may be used for the first TW-1, and the driver 468 may be used after one or more TWs. RF signals 416, which may come from the same source, are distributed to each TW 402, 406, where each driver, DR-n 418, 468 has either a common wide frequency response or its own frequency response and combines with the EO response of TW-n under the driver for a target EO frequency response. An RF signal delay 464, 466 for each TW 402, 406 is designed to match an optical delay.

Figure 5:
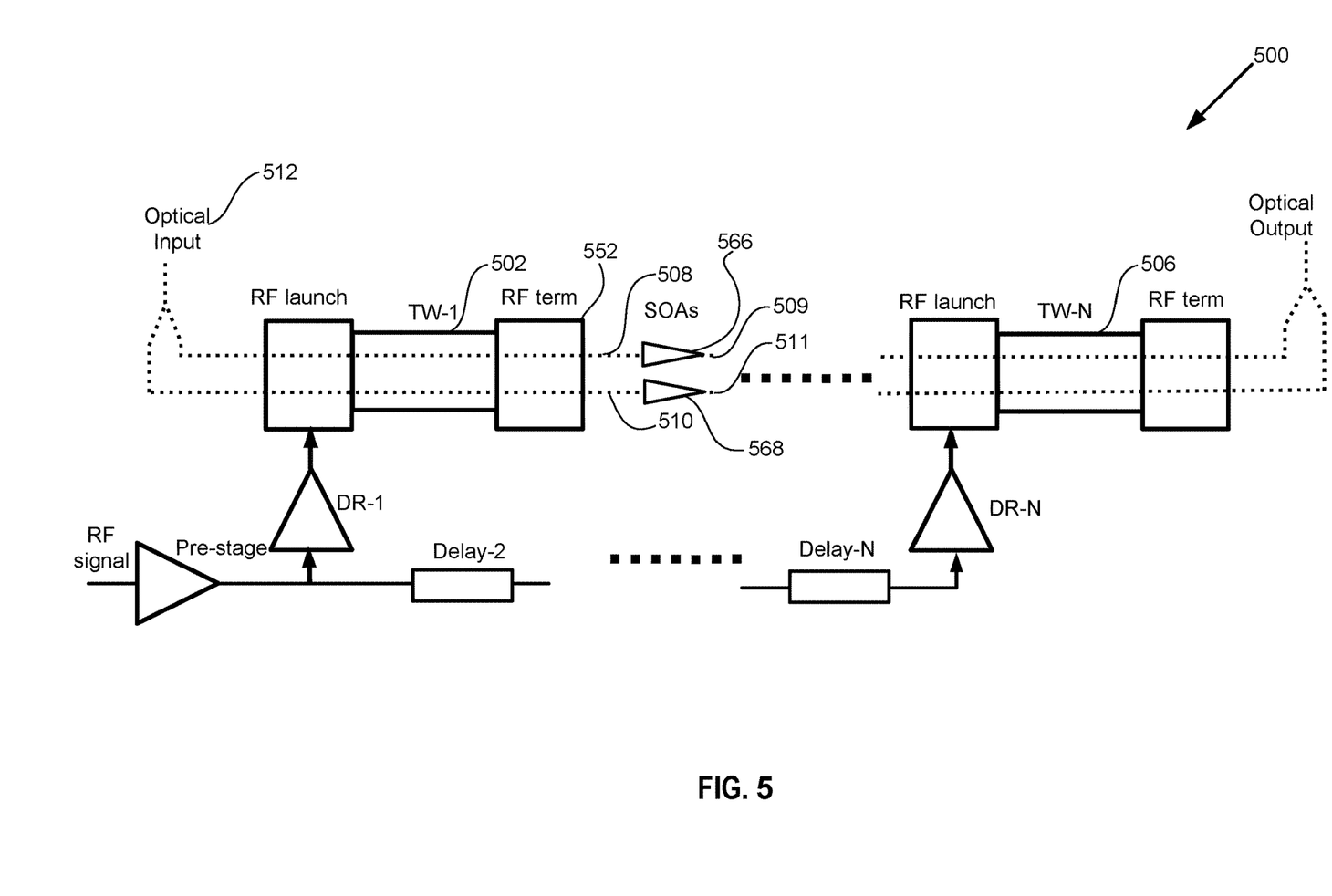
FIG. 5 is a block diagram of a multiple TW structure that includes semiconductor operational amplifiers (SOA), in accordance with various embodiments.

FIG. 5 is a block diagram of a multiple TW structure that includes integrated SOAs, in accordance with various embodiments. Multiple TW structure 500, which may be similar to multiple TW structure 400 of FIG. 4, includes one or more distributed SOAs can be used to booster optical signals after one or more TW by integrated SOAs. Multiple TW structure 500 shows synthesis with multiple TWs 502, 506 and distributed drivers and SOAs 566, 568. In embodiments, an RF signal delay for each TW 502, 506 may be designed to match an optical delay. The optical power of input 508, 510 and output 509, 511 of SOAs 566, 568 may be controlled by adjusting bias current of SOAs 566, 568, to maintain linear operation for high speed optical modulation signals.

Figure 6A:
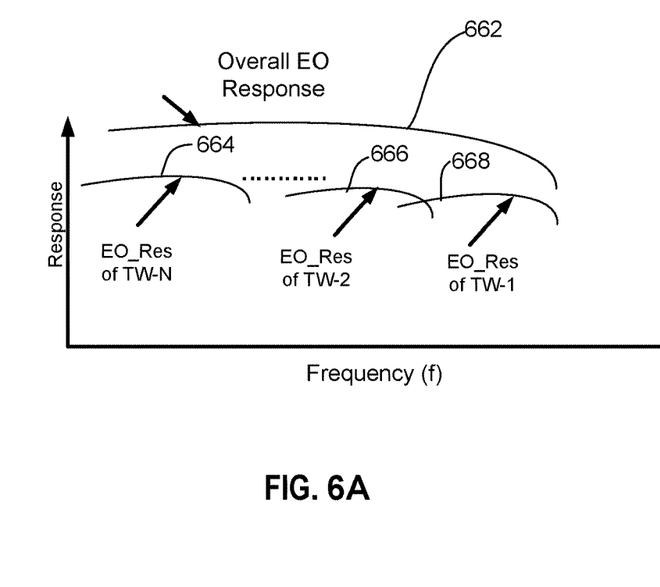
FIG. 6A-6B show graphs of response versus frequency for an overall synthesized EO frequency response of a multiple TW structure and individual EO frequency responses for each TW for a flat response and for a frequency peak, in accordance with various embodiments.
Figure 6B:
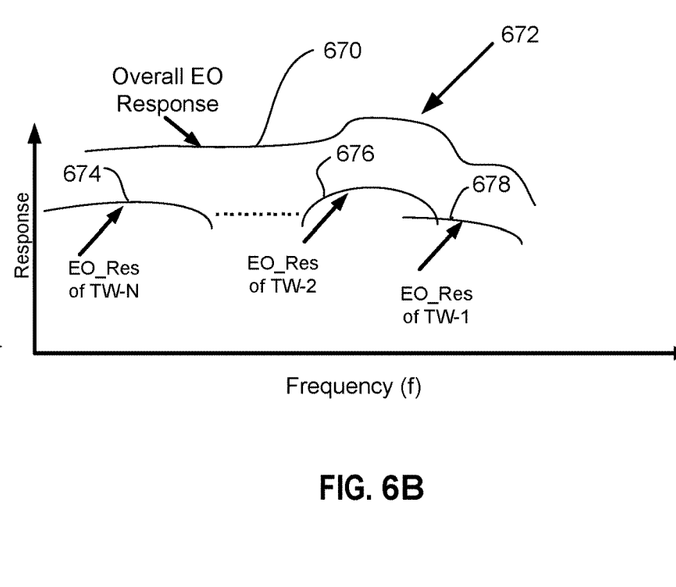

FIG. 6A-6B show graphs of response versus frequency for an overall synthesized EO response of a multiple TW structure and individual EO responses for each TW for a flat response and for a frequency peak, in accordance with various embodiments. FIG. 6A shows an example of a flat response, where the individual EO-Res curves of the TWs 664, 666, 668 are combined to produce an overall flat response over a broader frequency range as represented by the overall EO response curve 662. FIG. 6B shows an example of a frequency peak, where the individual EO-Res curves of the TWs 674, 678 are relatively flat, with the EO_Res curve of TW 676 including a peak. As a result, the overall EO response curve 670 includes a target peak 672 within the frequency range by adjusting a peaking from EO-Res curve 676.

Figure 7:
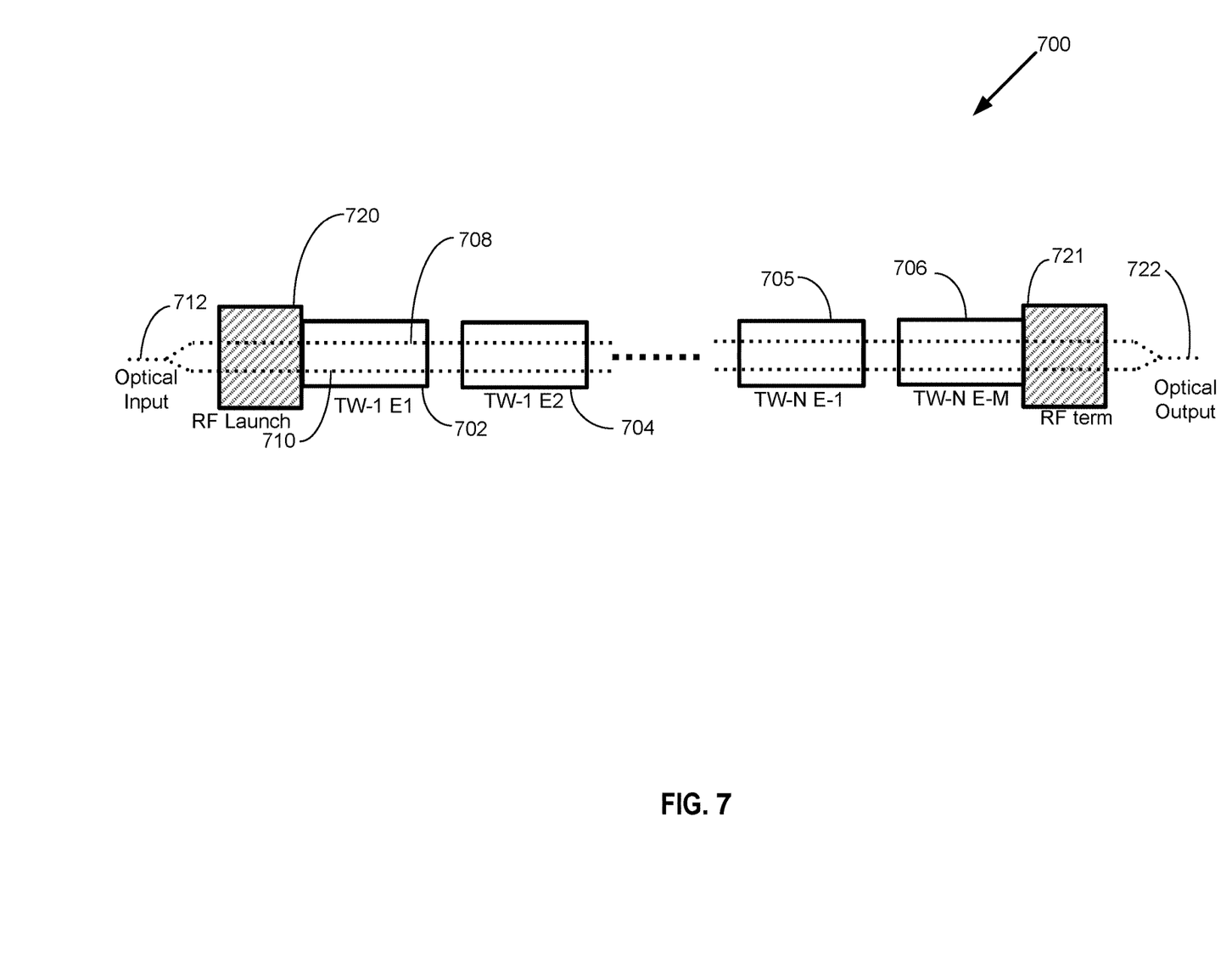
FIG. 7 show a layout of a multiple TW structure with TWs in series, in accordance with various embodiments.

FIG. 7 show a layout of a multiple TW structure with TWs in series, in accordance with various embodiments. Multiple TW structure 700, which may be similar to multiple TW structure of FIG. 3, includes an optical input 712, a RF launch 720, optical path 708, 710, and traveling waveguides 702, 704, 705, 706, which may be similar to optical input 312, RF launch 320, optical paths 308, 310, and traveling waveguides 302, 306 of FIG. 3. As shown, each of the traveling waveguides 702, 704, 705, 706 are positioned within a horizontal line, which may be referred to as a serial positioning of the respective traveling waveguides, with the optical outputs of a traveling waveguide such as traveling waveguide 702 serves as the optical inputs of the following waveguide, such as traveling waveguide 704.

Figure 8:
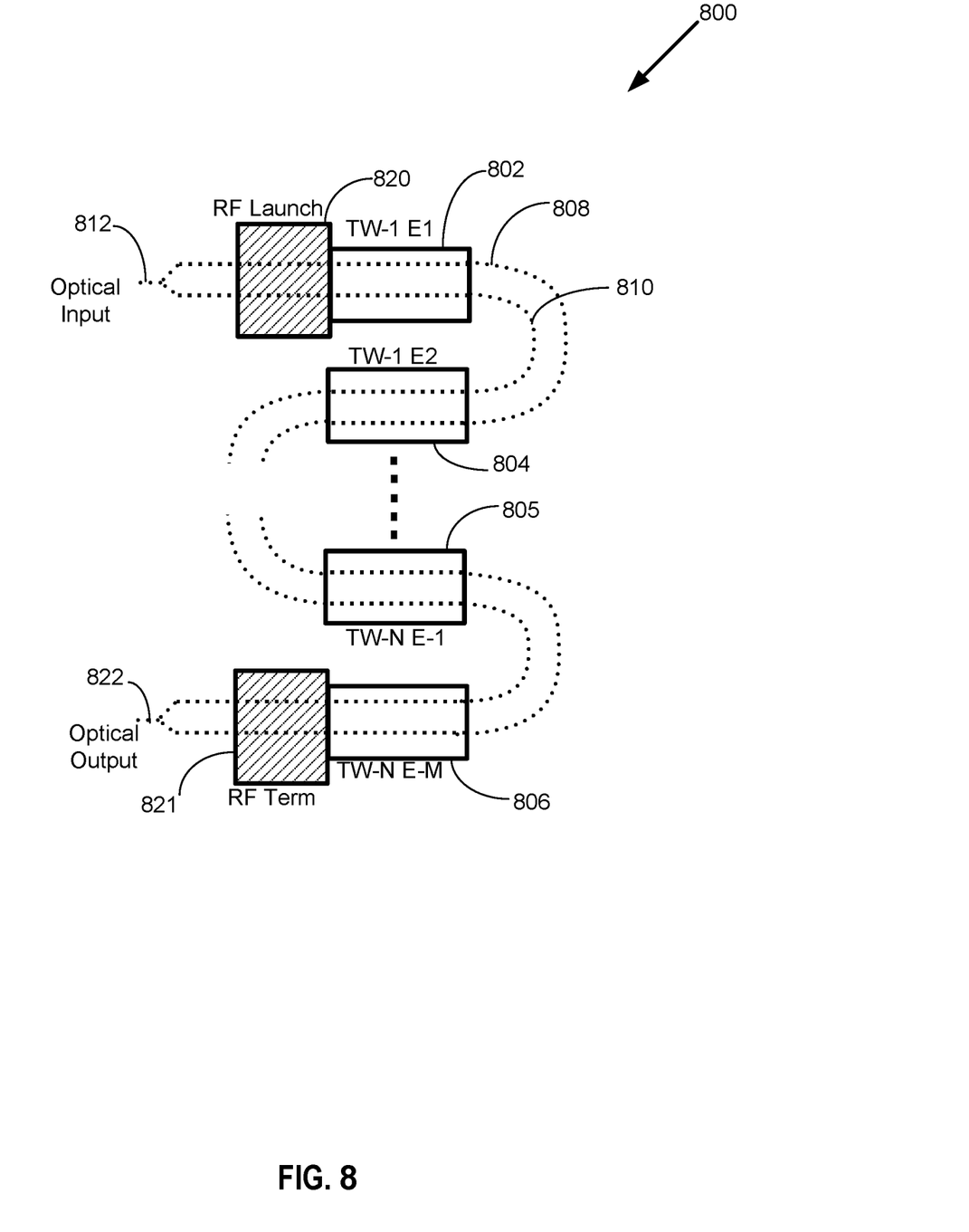
FIG. 8 shows a layout of a multiple TW structure with TWs in parallel, in accordance with various embodiments.

FIG. 8 shows a layout of a multiple TW structure with TWs in parallel, in accordance with various embodiments. Multiple TW structure 800 may include an optical input 812, a RF launch 820, optical path 808, 810, and traveling waveguides 802, 804, 805, 806, which may be similar to optical input 312, RF launch 320, optical paths 308, 310, and traveling waveguides 302, 306 of FIG. 1. As shown, each of the traveling waveguides 802, 804, 805, 806 are positioned with a vertical orientation, which may also be referred to as a parallel orientation, where the optical paths 808, 810 bend such that the output of a first traveling waveguide such as traveling waveguide 802 travels to the input of the second traveling waveguide such as traveling waveguide 804.

In embodiments, the TW in series as shown with respect to FIG. 7 and in parallel as shown with respect to FIG. 8 may be used to improve physical size of the die. In embodiments, the layout of TW in series and in parallel may be selected for physical size and performances. In embodiments, distributed drivers may be included within the configurations shown with respect to FIG. 7 or FIG. 8, similar to the configuration in FIG. 4 In embodiments, SOAs may be included within the configurations shown with respect to FIG. 7 or FIG. 8, with similar to the configuration in FIG. 5

In embodiments, an optimized design for a target frequency response of individual TWs may be achieved by selecting various parameters for the TW, including RF TW length, PN, doping levels, periodic structure designed such as T-rail design, and the like. These individual TWs may then be coupled serially to result in a multiple TW structure that is optimized for performance over a large target frequency range. In embodiments, artificial intelligence (AI) training techniques may be used to select the various TW parameters for each TW in order to quickly identify and optimize design for the multiple TW structures to meet the overall target frequency response over a defined wide frequency range. It should be noted that the techniques used for synthesis may be applied to any material platform including silicon photonics and InP material base modulators.

Figure 9:
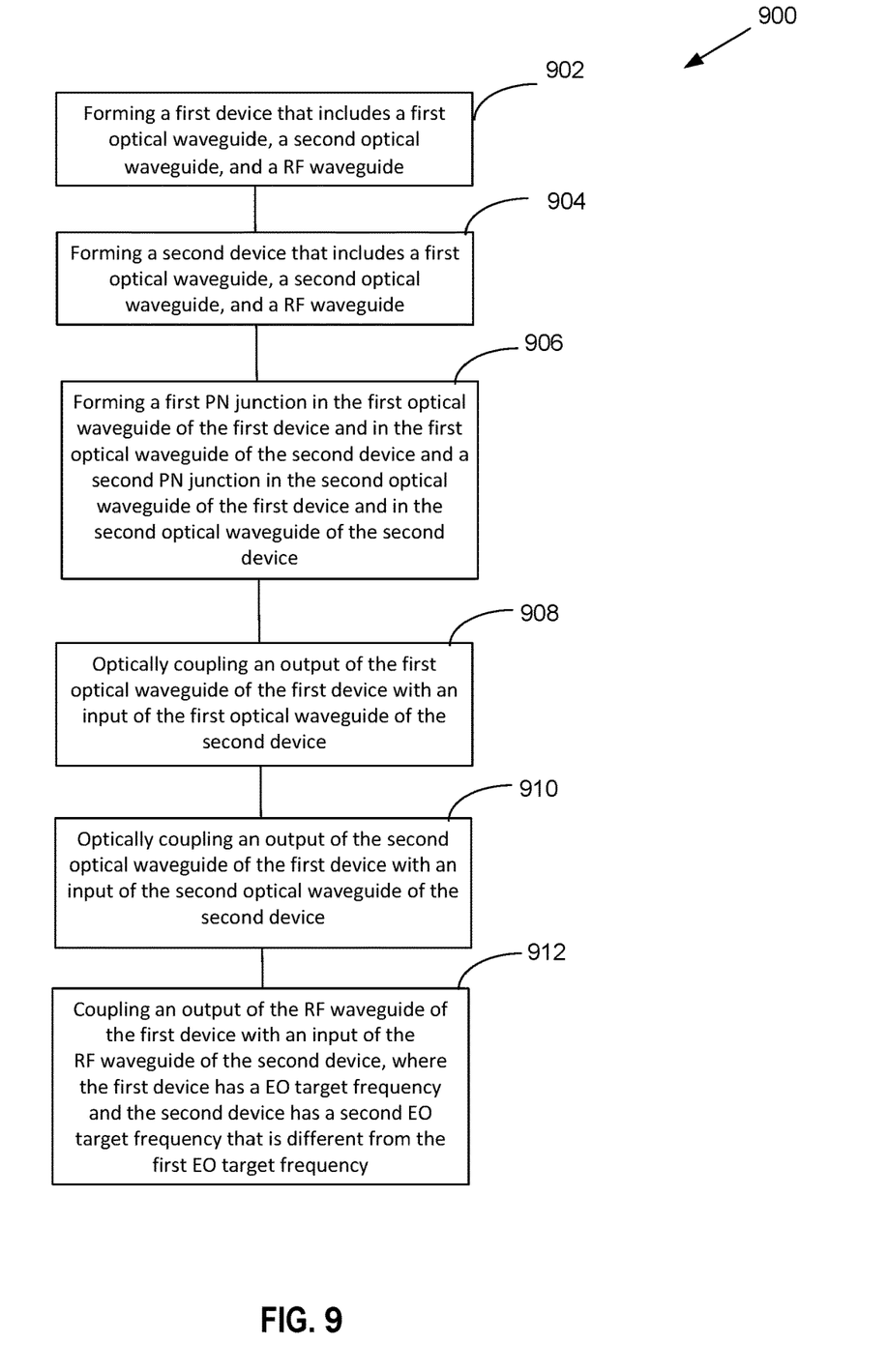
FIG. 9 illustrates a process for creating a multiple TW structure, in accordance with various embodiments.

FIG. 9 illustrates a process for creating a multiple TW structure, in accordance with various embodiments. Process 900 may be implemented using any of the techniques, processes, apparatus, systems, or methods described herein, and particularly with respect to FIGS. 1-8B.

At block 902, the process may include forming a first device that includes a first optical waveguide, a second optical waveguide, and a RF waveguide.

At block 904, the process may further include forming a second device that includes a first optical waveguide, a second optical waveguide, and a RF waveguide.

At block 906, the process may further include push-pull PN junctions with a first PN junction in the first optical waveguide of the first device and the second device, and a second PN junction in the second optical waveguide of the first device and the second device.

At block 908, the process may further include optically coupling an output of the first optical waveguide of the first device with an input of the first optical waveguide of the second device.

At block 910, the process may further include optically coupling an output of the second optical waveguide of the first device with an input of the second optical waveguide of the second device.

At block 912, the process may further include coupling an output of the RF waveguide of the first device with an input of the RF waveguide of the second device, where the first device has a first EO target frequency response and the second device has a second EO target frequency response that is different from the first EO target frequency response.

Figure 10:
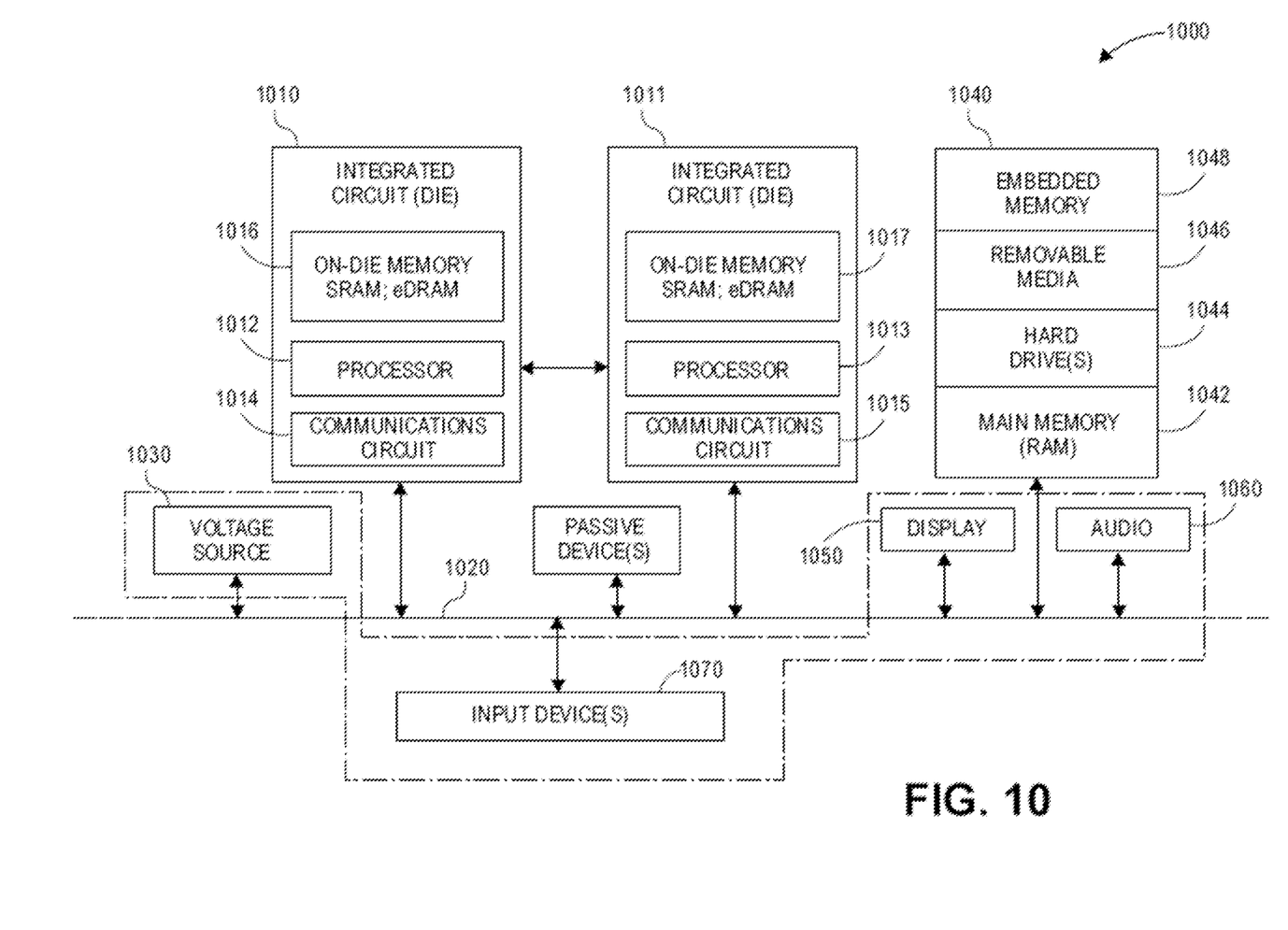
FIG. 10 schematically illustrates a computing device, in accordance with various embodiments.

FIG. 10 schematically illustrates a computing device, in accordance with various embodiments. The computer system 1000 (also referred to as the electronic system 1000) as depicted can embody synthesis of multiple traveling waveguides to facilitate optical modulation, according to any of the several disclosed embodiments and their equivalents as set forth in this disclosure. The computer system 1000 may be a mobile device such as a netbook computer. The computer system 1000 may be a mobile device such as a wireless smart phone. The computer system 1000 may be a desktop computer. The computer system 1000 may be a hand-held reader. The computer system 1000 may be a server system. The computer system 1000 may be a supercomputer or high-performance computing system.

In an embodiment, the electronic system 1000 is a computer system that includes a system bus 1020 to electrically couple the various components of the electronic system 1000. The system bus 1020 is a single bus or any combination of busses according to various embodiments. The electronic system 1000 includes a voltage source 1030 that provides power to the integrated circuit 1010. In some embodiments, the voltage source 1030 supplies current to the integrated circuit 1010 through the system bus 1020.

The integrated circuit 1010 is electrically coupled to the system bus 1020 and includes any circuit, or combination of circuits according to an embodiment. In an embodiment, the integrated circuit 1010 includes a processor 1012 that can be of any type. As used herein, the processor 1012 may mean any type of circuit such as, but not limited to, a microprocessor, a microcontroller, a graphics processor, a digital signal processor, or another processor. In an embodiment, the processor 1012 includes, or is coupled with, synthesis of multiple traveling waveguides to facilitate optical modulation, as disclosed herein. In an embodiment, SRAM embodiments are found in memory caches of the processor. Other types of circuits that can be included in the integrated circuit 1010 are a custom circuit or an application-specific integrated circuit (ASIC), such as a communications circuit 1014 for use in wireless devices such as cellular telephones, smart phones, pagers, portable computers, two-way radios, and similar electronic systems, or a communications circuit for servers. In an embodiment, the integrated circuit 1010 includes on-die memory 1016 such as static random-access memory (SRAM). In an embodiment, the integrated circuit 1010 includes embedded on-die memory 1016 such as embedded dynamic random-access memory (eDRAM).

In an embodiment, the integrated circuit 1010 is complemented with a subsequent integrated circuit 1011. Useful embodiments include a dual processor 1013 and a dual communications circuit 1015 and dual on-die memory 1017 such as SRAM. In an embodiment, the dual integrated circuit 1010 includes embedded on-die memory 1017 such as eDRAM.

In an embodiment, the electronic system 1000 also includes an external memory 1040 that in turn may include one or more memory elements suitable to the particular application, such as a main memory 1042 in the form of RAM, one or more hard drives 1044, and/or one or more drives that handle removable media 1046, such as diskettes, compact disks (CDs), digital variable disks (DVDs), flash memory drives, and other removable media known in the art. The external memory 1040 may also be embedded memory 1048 such as the first die in a die stack, according to an embodiment.

In an embodiment, the electronic system 1000 also includes a display device 1050, an audio output 1060. In an embodiment, the electronic system 1000 includes an input device such as a controller 1070 that may be a keyboard, mouse, trackball, game controller, microphone, voice-recognition device, or any other input device that inputs information into the electronic system 1000. In an embodiment, an input device 1070 is a camera. In an embodiment, an input device 1070 is a digital sound recorder. In an embodiment, an input device 1070 is a camera and a digital sound recorder.

As shown herein, the integrated circuit 1010 can be implemented in a number of different embodiments, including synthesis of multiple traveling waveguides to facilitate optical modulation, according to any of the several disclosed embodiments and their equivalents, an electronic system, a computer system, one or more methods of fabricating an integrated circuit, and one or more methods of fabricating an electronic assembly that includes synthesis of multiple traveling waveguides to facilitate optical modulation, according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed synthesis of multiple traveling waveguides to facilitate optical modulation embodiments and their equivalents. A foundation substrate may be included, as represented by the dashed line of FIG. 10. Passive devices may also be included, as is also depicted in FIG. 10.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

The following paragraphs describe examples of various embodiments.

EXAMPLES

Example 1 is an apparatus comprising: a first device and a second device each including a first optical waveguide, a second optical waveguide, and a radiofrequency (RF) waveguide; wherein an output of the first optical waveguide of the first device is optically coupled with an input of the first optical waveguide of the second device, the output of the second optical waveguide of the first device is optically coupled with an input of the second optical waveguide of the second device, and an output of the RF waveguide of the first device is coupled with an input of the RF waveguide of the second device; a first PN junction within the first optical waveguide of the first device and the second device; a second PN junction within the second optical waveguide of the first device and the second device; wherein the first device has a first electro-optical (EO) target frequency response and the second device has a second EO target frequency response.

Example 2 includes the apparatus of example 1, wherein the first PN junction and the second PN junction are push-pull PN junctions.

Example 3 includes the apparatus of example 1, further comprising: an optical splitter with an input optically coupled with an optical input, the optical splitter includes a first optical output coupled with the input of first optical waveguide of the first device and a second optical output coupled with the input of the second optical waveguide of the first device; and wherein an output of the first optical waveguide of the second device and an output of the second optical waveguide of the second device are combined to form a Mach-Zehnder modulator (MZM).

Example 4 includes the apparatus of example 1, wherein the first device and the second device are travelling waveguides.

Example 5 includes the apparatus of example 1, wherein the first EO target frequency response of the first device is different than the second EO target frequency response of the second device.

Example 6 includes the apparatus of example 5, wherein one or more parameters of the first device is different than one or more parameters of the second device; and wherein the one or more parameters of the first device and the one or more parameters of the second device are determined based upon an identified high-speed modulation frequency response over an operating frequency range that provides different phase matches at different frequencies.

Example 7 includes the apparatus of example 6, wherein the one or more parameters further include: physical dimensions or material compositions of the first optical waveguide or the second optical waveguide of the first device or the second device, doping levels of the first PN junction and the second PN junction of the first device or the second device, or physical dimensions or material compositions of the RF waveguide of the first device or the second device; and wherein the one or more parameters are identified based upon a target frequency response of the first device or of the second device.

Example 8 includes the apparatus of example 5, wherein the parameters include a selected one or more of: a PN junction, a PN doping level, RF waveguide, optical waveguide, or semiconductor optical amplifier (SOA).

Example 9 includes the apparatus of example 1, further comprising a termination component coupled with an output of the second device.

Example 10 includes the apparatus of example 9, wherein the termination component has an impedance match with an impedance of the RF waveguide of the second device.

Example 11 includes the apparatus of example 1, wherein the RF waveguide of the first device or the RF waveguide of the second device include periodic structures that are aligned, respectively, along a direction of the RF waveguide of the first device or the RF waveguide of the second device to facilitate an identified high-speed modulation response.

Example 12 includes the apparatus of example 11, wherein the periodic structures include T-rail structures.

Example 13 includes the apparatus of example 12, wherein a selected one or more of physical dimensions of each T-rail structure, material composition of each T-rail structure, or periods of each T-rail structure are based on a RF index value to facilitate phase matches between the RF waveguide and optical waveguides at within a defined frequency range during operation.

Example 14 includes the apparatus of example 1, further comprising a RF signal driver coupled with an input of the RF waveguide of the first device.

Example 15 includes the apparatus of example 1, further comprising a RF signal driver coupled with an input of the RF waveguide of the second device.

Example 16 includes the apparatus of example 15, further comprising a RF signal delay component coupled with an input of the RF signal driver.

Example 17 includes the apparatus of example 15, further comprising a semiconductor optical amplifier (SOA) optically coupled with the output of the first device and with the input of the second device.

Example 18 includes the apparatus of example 15, further comprising a RF termination component coupled with an output of the first device.

Example 19 includes the apparatus of example 18, wherein the RF termination component is impedance matched with an RF waveguide of the first device.

Example 20 includes the apparatus of example 19, wherein the first device and the second device, during operation, facilitate a determined frequency response range during operation of the apparatus.

Example 21 includes the apparatus of example 19, wherein the identified parameters are determined based upon an artificial intelligence (AI) engine, the AI engine trained on multiple values of the parameters to identify the determined frequency response range during operation of the apparatus.

Example 22 includes the 22. The apparatus of example 1, wherein the first device and the second device are aligned in a selected one of: in series or in parallel.

Example 23 includes the apparatus of example 1, further including an RF launch component coupled with an input of the RF waveguide of the first device.

Example 24 includes the apparatus of any one of examples 1-23, further comprising one or more semiconductor operational amplifiers (SOA) between the first device and the second device to amplify one or more optical signals.

Example 25 includes the apparatus of example 1, wherein the first or the second device further includes first optical waveguide or the second optical waveguide of the first device or the second device includes PN junctions.

Example 26 is a method for forming a traveling waveguide structure, the method comprising: forming a first device that includes a first optical waveguide, a second optical waveguide, and a radiofrequency (RF) waveguide; forming a second device that includes a first optical waveguide, a second optical waveguide, and a RF waveguide; forming a first PN junction in the first optical waveguide of the first device and in the first optical waveguide of the second device and a second PN junction in the second optical waveguide of the first device and in the second optical waveguide of the second device; optically coupling an output of the first optical waveguide of the first device with an input of the first optical waveguide of the second device; optically coupling an output of the second optical waveguide of the first device with an input of the second optical waveguide of the second device; coupling an output of the RF waveguide of the first device with an input of the RF waveguide of the second device; and wherein the first device has a first electro-optical (EO) target frequency response and the second device has a second EO target frequency response that is different from the first EO target frequency response.

Example 27 includes the method of example 26, wherein the first device and the second device are travelling waveguides.

Example 28 includes the method of example 26, wherein the first PN junction and the second PN junction are push-pull junctions.

Example 29 includes the method of any one of examples 26-28, further comprising coupling a termination component with an output of the first device or an output of the second device.

Example 30 is a system comprising: a radiofrequency (RF) signal generator; an optical input source; a distributed traveling waveguide structure coupled with the RF signal generator and coupled with the optical input source, the distributed traveling waveguide structure comprising: a first traveling waveguide (TW) and a second TW each including a first optical waveguide, a second optical waveguide, and a radiofrequency (RF) waveguide; wherein an output of the first optical waveguide of the first TW is optically coupled with an input of the first optical waveguide of the second TW, the output of the second optical waveguide of the first TW is optically coupled with an input of the second optical waveguide of the second TW, and an output of the RF waveguide of the first TW is coupled with an input of the RF waveguide of the second TW; a first PN junction in the first optical waveguide; a second PN junction in the second optical waveguide; wherein the first traveling waveguide has a first electro-optical (EO) target frequency response and the second traveling waveguide has a second EO target frequency response that is different from the first EO target frequency response to facilitate optical modulation.

Example 31 includes the system of example 30, further comprising an optical splitter coupled with the optical input source and coupled with an input of the first optical waveguide of the first TW and with an input of the second optical waveguide of the first TW; and wherein an output of the first optical waveguide of the second device and an output of the second optical waveguide of the second device are combined to form a Mach-Zehnder modulator (MZM).

Example 32 includes the system of any one of examples 30-31, wherein the first PN junction and the second PN junction are push-pull PN junctions.

Example 33 includes the apparatus, method, or system of any example or any embodiment described herein, wherein the layouts of a multiple TW structure can be formed with TWs in series and in parallel, in accordance with various embodiments.

Example 34 includes the apparatus, method, or system of any example or any embodiment described herein, wherein the layouts of a multiple TW structure in series and in parallel may be selected for physical size and performances with distributed drivers with or without SOA.

Example 35 includes the apparatus, method, or system of any example or any embodiment described herein, wherein the an optimized design for a target frequency response of individual TWs is synthesized with multiple elements of each individual TWs by various selected parameters including PN junctions, doping levels, physical dimensions and material compositions of optical waveguides and RF waveguides, impedance to be matched between RF waveguide and terminal, driver frequency response to be matched with TW.

Example 36 includes the apparatus, method, or system of any example or any embodiment described herein, wherein these individual TWs is then be coupled serially to result in a multiple TW structure that provides apparatus and method to synthesize the target frequency response of the combined TW to achieve the overall identified performance of optical modulation over a defined wide frequency range.

Example 37 includes the apparatus, method, or system of any example or any embodiment described herein, wherein artificial intelligence (AI) techniques are used to complete iterative training with various selected TW parameters for each TW in order to identify and optimize design for the combined TW structure to meet the overall identified frequency response over a defined wide frequency range.

What is claimed is:
1. An apparatus comprising:
a first device and a second device each including a first optical waveguide, a second optical waveguide, and a radiofrequency (RF) waveguide;
wherein an output of the first optical waveguide of the first device is optically coupled with an input of the first optical waveguide of the second device, the output of the second optical waveguide of the first device is optically coupled with an input of the second optical waveguide of the second device, and an output of the RF waveguide of the first device is coupled with an input of the RF waveguide of the second device;

a first PN junction within the first optical waveguide of the first device and the second device;

a second PN junction within the second optical waveguide of the first device and the second device;

wherein the first device has a first electro-optical (EO) target frequency response and the second device has a second EO target frequency response that is different than the first EQ target frequency response.

2. The apparatus of claim 1, wherein the first PN junction and the second PN junction are push-pull PN junctions.

3. The apparatus of claim 1, further comprising:

an optical splitter with an input optically coupled with an optical input, the optical splitter includes a first optical output coupled with the input of the first optical waveguide of the first device and a second optical output coupled with the input of the second optical waveguide of the first device; and wherein an output of the first optical waveguide of the second device and an output of the second optical waveguide of the second device are combined to form a Mach-Zehnder modulator (MZM).

4. The apparatus of claim 1, wherein the first device and the second device are travelling waveguides.

5. The apparatus of claim 1, wherein one or more parameters of the first device is different than one or more parameters of the second device; and wherein the one or more parameters of the first device and the one or more parameters of the second device are determined based upon an identified high-speed modulation frequency response over an operating frequency range that provides different phase matches at different frequencies.

6. The apparatus of claim 5, wherein the one or more parameters further include: physical dimensions or material compositions of the first optical waveguide or the second optical waveguide of the first device or the second device, doping levels of the first PN junction and the second PN junction of the first device or the second device, or physical dimensions or material compositions of the RF waveguide of the first device or the second device; and wherein the one or more parameters are identified based upon a target frequency response of the first device or of the second device.

7. The apparatus of claim 5, wherein the one or more parameters include a selected one or more of: a PN junction, a PN doping level, RF waveguide, optical waveguide, or semiconductor optical amplifier (SOA).

8. The apparatus of claim 1, further comprising a termination component coupled with an output of the second device.

9. The apparatus of claim 8, wherein the termination component has an impedance match with an impedance of the RF waveguide of the second device.

10. The apparatus of claim 1, wherein the RF waveguide of the first device or the RF waveguide of the second device include periodic structures that are aligned, respectively, along a direction of the RF waveguide of the first device or the RF waveguide of the second device to facilitate an identified high-speed modulation response.

11. The apparatus of claim 10, wherein the periodic structures include T-rail structures.

12. The apparatus of claim 11, wherein a selected one or more of physical dimensions of each T-rail structure, material composition of each T-rail structure, or periods of each T-rail structure are based on a RF index value to facilitate phase matches between the RF waveguide and optical waveguides within a defined frequency range during operation.

13. The apparatus of claim 1, further comprising a RF signal driver coupled with an input of the RF waveguide of the first device.

14. The apparatus of claim 1, further comprising a RF signal driver coupled with an input of the RF waveguide of the second device.

15. The apparatus of claim 14, further comprising a RF signal delay component coupled with an input of the RF signal driver.

16. The apparatus of claim 14, further comprising a semiconductor optical amplifier (SOA) optically coupled with an output of the first device and with an input of the second device.

17. The apparatus of claim 14, further comprising a RF termination component coupled with an output of the first device.

18. The apparatus of claim 17, wherein the RF termination component is impedance matched with the RF waveguide of the first device.

19. The apparatus of claim 18, wherein the first device and the second device, during operation, facilitate a determined frequency response range during operation of the apparatus.

20. The apparatus of claim 1, wherein the first device and the second device are aligned in a selected one of: in series or in parallel.

21. The apparatus of claim 1, further including an RF launch component coupled with an input of the RF waveguide of the first device.

22. The apparatus of claim 1, further comprising one or more semiconductor operational amplifiers (SOA) between the first device and the second device to amplify one or more optical signals.

23. A method for forming a traveling waveguide structure, the method comprising:

forming a first device that includes a first optical waveguide, a second optical waveguide, and a radiofrequency (RF) waveguide;

forming a second device that includes a first optical waveguide, a second optical waveguide, and a RF waveguide;

forming a first PN junction in the first optical waveguide of the first device and in the first optical waveguide of the second device and a second PN junction in the second optical waveguide of the first device and in the second optical waveguide of the second device;

optically coupling an output of the first optical waveguide of the first device with an input of the first optical waveguide of the second device;

optically coupling an output of the second optical waveguide of the first device with an input of the second optical waveguide of the second device;

coupling an output of the RF waveguide of the first device with an input of the RF waveguide of the second device; and wherein the first device has a first electro-optical (EO) target frequency response and the second device has a second EO target frequency response that is different from the first EO target frequency response.

24. The method of claim 23, wherein the first device and the second device are travelling waveguides.

25. The method of claim 23, wherein the first PN junction and the second PN junction are push-pull junctions.

26. The method of claim 23, further comprising coupling a termination component with an output of the first device or an output of the second device.

27. A system comprising:
a radiofrequency (RF) signal generator;
an optical input source;
a distributed traveling waveguide structure coupled with the RF signal generator and coupled with the optical input source, the distributed traveling waveguide structure comprising:
a first traveling waveguide (TW) and a second TW each including a first optical waveguide, a second optical waveguide, and a radiofrequency (RF) waveguide;
wherein an output of the first optical waveguide of the first TW is optically coupled with an input of the first optical waveguide of the second TW, the output of the second optical waveguide of the first TW is optically coupled with an input of the second optical waveguide of the second TW, and an output of the RF waveguide of the first TW is coupled with an input of the RF waveguide of the second TW;
a first PN junction in the first optical waveguide of the first TW or the second TW;
a second PN junction in the second optical waveguide of the first TW or the second TW;
wherein the first traveling waveguide has a first electro-optical (EO) target frequency response and the second traveling waveguide has a second EO target frequency response that is different from the first EO target frequency response to facilitate optical modulation.

28. The system of claim 27, further comprising an optical splitter coupled with the optical input source and coupled with an input of the first optical waveguide of the first TW and with an input of the second optical waveguide of the first TW; and
wherein an output of the first optical waveguide of the second TW and an output of the second optical waveguide of the second TW are combined to form a Mach-Zehnder modulator (MZM).

29. The system of claim 27, wherein the first PN junction and the second PN junction are push-pull PN junctions.

\* \* \* \* \*